United States Patent Office 2,977,196
Patented Mar. 28, 1961

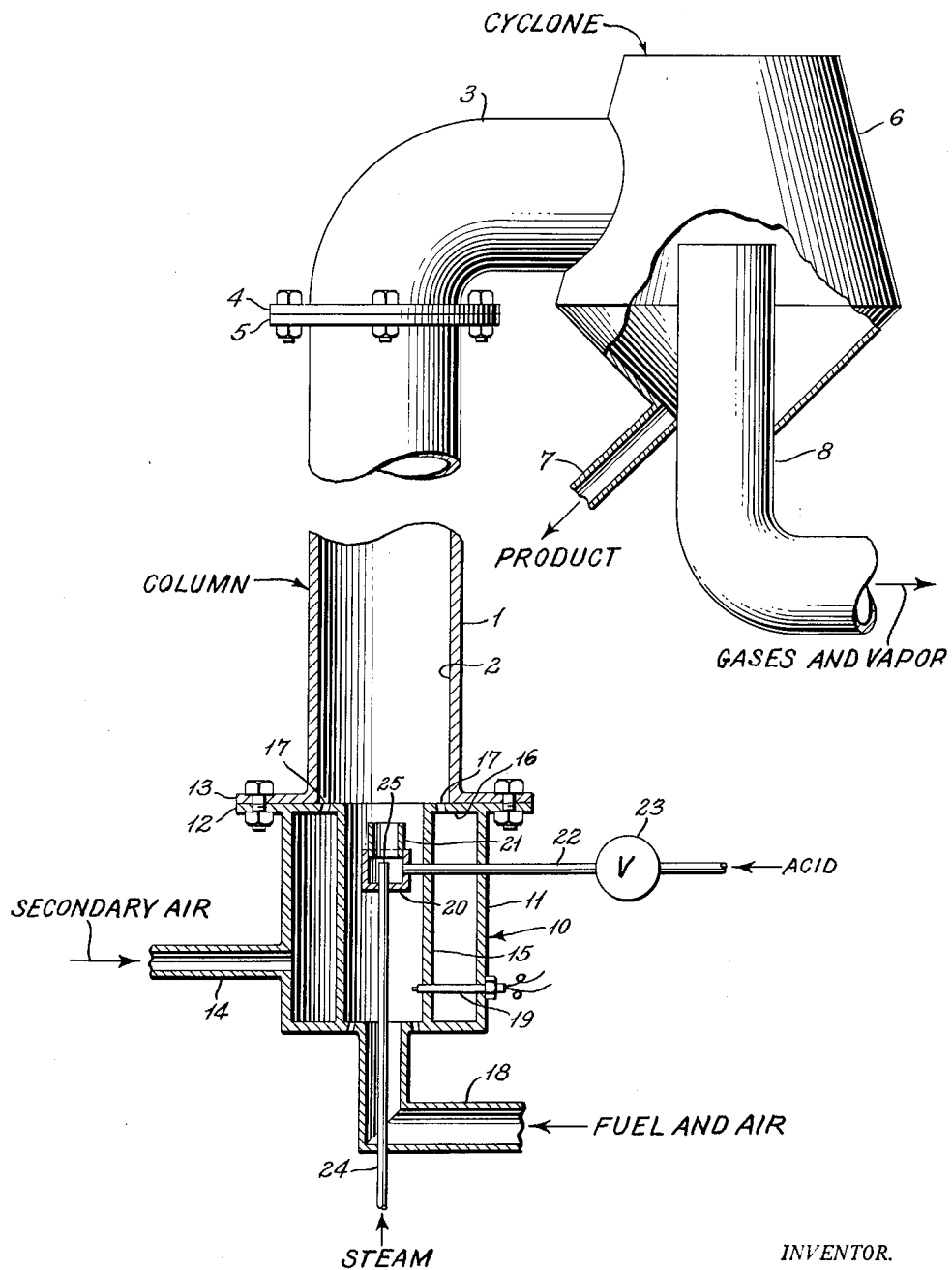

2,977,196
DEFLUORINATION METHOD

Raymond C. Fleming, Jr., Lakeland, Fla., assignor to International Minerals & Chemical Corporation, a corporation of New York Filed July 1, 1955, Ser. No. 519,446

10 Claims. (Cl. 23—165)

This invention relates to the elimination of fluorine from fluorine-containing phosphatic materials. More particularly the invention relates to a method for thermally eliminating fluorine from fluorine-containing phosphatic materials in aqueous solution.

The economical commercial production from phosphate rock of phosphatic products of low fluorine content has challenged the art for many years. The various methods heretofore proposed may be classified in three broad categories. A first category embraces methods for the treatment of phosphate rock per se to reduce the fluorine content thereof. The second category embraces those methods which entail the treatment of a mixture of rock plus reagents, such as silica, water vapor, and limited quantities of acids, which are not effective to convert a significant proportion of the phosphorus pentoxide present in the rock into water-soluble form. The methods falling into these first two categories generally require heating the rock to be defluorinated to temperatures approaching or exceeding the rock fusion temperature and are, therefore, industrially unattractive.

The defluorination processes of the third category embrace reaction of the phosphate rock with reagents, such as mineral acids, under conditions and in concentrations which are effective to render at least a major portion of the phosphate values present in the rock water-soluble, aqueous extraction of the solubilized phosphate values, and chemical or thermal defluorination of the resulting extract. Chemical defluorination of such extracts is conventionally accomplished by the addition of an alkali metal or alkaline earth metal salt or base which is effective, under carefully controlled conditions, to form a precipitate containing substantially all of the fluorine initially present. Frequently, in such chemical defluorination processes, a substantial quantity of the phosphorus values which are present in the extract are lost to the fluorine-rich precipitate. Additionally, the careful control of the chemical defluorination reaction, which is requisite to the production of a suitably defluorinated product in good yield, may prove commercially difficult to achieve.

Methods proposed in the prior art for the thermal defluorination of phosphate rock extract solutions include the passage of superheated steam through a body of fluorine containing phosphoric acid, the contact of combustion gases with fluorine-containing phosphoric acid, and the preheating of fluorine-containing phosphoric acid followed by spraying of the preheated acid into a warm atmosphere. Such prior art thermal defluorination processes require excessive amounts of heat or steam and fail to effect a satisfactory degree of defluorination in a reasonable time.

It is a primary object of the invention to provide a novel and economical method for the thermal defluorination of fluorine-containing phosphatic materials in aqueous solution.

It is a further primary object of the invention to provide a method for producing fluorine compounds from fluorine-containing phosphatic materials.

It is a more specific object of the invention to provide a method for intimately mixing steam, flame, and an aqueous solution of a fluorine-containing phosphatic material whereby the fluorine content of the phosphatic material is substantially reduced.

It is a further specific object of the invention to provide a method for eliminating fluorine from wet process phosphoric acid which method may in some embodiments be effective to simultaneously concentrate such acid and yield a product of substantially increased concentration and substantially reduced fluorine content.

An additional object of the invention entails the provision of novel apparatus for the thermal defluorination of aqueous solutions of fluorine-containing phosphatic materials.

The method of the invention generally embraces eliminating fluorine from fluorine-containing phosphatic materials in aqueous solution by concurrently introducing such solutions and steam into a flame in a combustion zone, intimately mixing and entraining said steam and said solution in subdivided form in combustion gases produced by said flame, removing said steam, combustion gases and solution from said combustion zone, separating said solution from said combustion gases and recovering said separated solution as a product containing phosphatic materials of reduced fluorine content.

The mixture of combustion gases and steam or vapor from which the product is separated will contain significant quantities of fluorine compounds eliminated from the treated solution. Such fluorine compounds are recovered by methods known to the art.

The invention is particularly applicable to the defluorination of fluorine-containing phosphatic compositions contained in solution in aqueous extracts of acidulated phosphate rock. The particular manner or degree of acidulation, the acid employed, the curing time if any of the acidulated rock prior to extraction, and the particular manner of removal of water insoluble materials such as calcium sulfate from the aqueous extracts so produced are all details of no significance to the method of the present invention which is applicable generically to eliminate fluorine from such extracts. Wet process phosphoric acid is a preferred starting material for defluorination pursuant to the method of the invention. Aqueous extracts of phosphate rock which has been acidulated to a degree sufficient to convert all the phosphate values of the rock to phosphoric acid are contemplated. Extracts of cured and fresh superphosphate which are primarily solutions of monocalcium phosphate are typical. Reference is made to copending LeBaron application Serial No. 312,519, now Patent No. 2,722,472, for a description of one method of producing such extracts. Other methods are well known to the art and are represented inter alia by Palazzo Patent 1,851,210 and Moore Patent 2,013,970. The invention is not restricted to the treatment of aqueous extracts of acidulated phosphate rock but is applicable generically to aqueous solutions of fluorine-containing phosphatic materials, regardless of origin.

In the preferred practice of the invention, the aqueous solution of the fluorine-containing phosphatic material is intimately mixed in subdivided form, normally a fine spray with steam and flame in a combustion zone, and thereafter removed from the combustion zone as an entrainment in the combustion gases produced by said flame. At least some of the steam introduced into the system concurrently with said subdivided solution is also removed from the combustion zone in intimate mixture with said combustion gases and entrained subdivided solution.

Preferably, the mixture of steam, combustion gases and subdivided solution are maintained in intimate mixture for a short period of time, generally at least about two seconds, and preferably from about three to about eight seconds, during which time the temperature of the mixture is at least about 300° F., preferably about 500° F. to about 900° F., to effect removal of fluorine compounds from said solution. In some cases, the flame may remain in contact with or be intermingled with the mixture of combustion gases, steam, and subdivided solution for a substantial portion of the time the effective removal of fluorine compounds from the subdivided solution proceeds.

Further, in accordance with the preferred practice of the invention, the steam which is essentially to the process is employed to aspirate or atomize the solution of fluorine-containing phosphatic material into the flame. Steam and finely divided solution can appropriately be introduced in an upward direction into the base of an upright flame and thence passed upwardly, together with combustion gases produced by said flame, through a vertical, elongated, defluorination reaction chamber positioned above said flame.

Steam is appropriately employed, pursuant to the method of the invention, at a temperature of at least about 312° F., preferably about 320° F. to about 350° F., at a pressure of at least about 65 pounds per square inch gauge, preferably a pressure of about 105 to about 150 pounds per square inch gauge. At least about three pounds of steam is preferably employed for each twenty pounds of phosphorus pentoxide present in the processed solution. An optimum range is from about twenty to about forty pounds of steam for each twenty pounds of phosphorus pentoxide present in such solution.

The invention contemplates the utilization of any desired quantity of steam and is not restricted to any specific amount. In general, as the amount of steam relative to phosphorus pentoxide present in the treated solution is increased, the degree of defluorination is increased. The maximum feasible amount of steam is frequently an equipment rather than a process limitation.

There is preferably employed a flame resulting from the combustion of gaseous fuel, such as natural gas, ethane, butane, propane, and the like, with air, oxygen, or a free oxygen-containing gas. Flames resulting from the combustion of such liquid fuels as gasoline, alcohol, and the like, with air or other free oxygen-supply gas are contemplated.

One appropriate apparatus which can be employed, inter alia, in the practice of the method of the invention is schematically represented in the drawing. The specific structural embodiment as illustrated on the drawing includes a vertical treating column 1 which provides an elongated cylindrical defluorination reaction chamber 2 through which the subdivided solution containing phosphate material to be defluorinated passes. In the apparatus shown, the column 1 may appropriately be about ten to about twenty-five feet in length, although columns of other lengths can be employed. An outlet duct 3 is connected to the upper end of column 1 by flanges 4 and 5 on duct 3 and column 1, respectively. Flanges 4 and 5 are welded, bolted or otherwise secured together by conventional means not shown. The tubular duct 3 communicates with a cyclone or other conventional entrainment separator 6 to introduce the flow of gases and liquids from column 1 tangentially into the separating chamber of separator 6. The separator is provided with a line 7 extending from the bottom thereof for the removal of separated liquid product and a stack 8 to permit the exit of gases and vapors.

Connected to the lower end of the vertical column 1 of the defluorinator there is provided a mixer and burner unit 10. This unit includes a housing 11 having a flange 12 connected to a flange 13 provided at the lower end of vertical column 1. A conduit 14 communicates with the interior of housing 11 to conduct thereinto secondary air which serves to promote complete combustion of the fuel burned in column 1. A central upstanding tube 15 extends through housing 11 and terminates adjacent the upper end thereof. The space between the upper ends of housing 11 and tube 15 is closed by a wall means 16 having a plurality of openings 17 which serve to direct the secondary air flowing from housing 11 upwardly into the lower end of column 1. A conduit 18 is connected with the lower end of tube 15 for the introduction of a combustible gaseous mixture of fuel and air into the lower end of the tube 15. An ignitor 19 is mounted within tube 15 to be energized by any suitable power source (not shown) upon initiation of the operation of the apparatus.

A header 20 is mounted centrally of the tube 15 and carries a mixing tube 21 which is concentric with tube 15 and opens outwardly adjacent the upper end of tube 15. A conduit 22 provided with a flow-controlling valve 23 communicates with the interior of header 20 and admits the feed of phosphatic solution into header 20. A steam inlet pipe 24 extends into header 20 with the outlet end 25 thereof positioned concentrically within mixing tube 20 so that flow of steam through pipe 24 and outwardly through its outlet end 25 will serve to propel feed solution in finely divided or spray form from header 20 outwardly through mixing tube 21 and upwardly into the lower end of column 1.

From the structure described hereinabove, the operation of the mixer and burner unit will be readily understood. As the fuel and air mixture is introduced into tube 15 through conduit 18 and thereafter ignited by igniter 19, feed solution introduced into header 20 through conduit 22 will be propelled as a spray from conduit 22 upwardly through or into the center of the flame produced by the burning mixture of fuel and air. As the acid and steam intimately mix with the flame and the products of combustion flowing upwardly through tube 15 and thence into vertical column 1, secondary air is admitted from housing 11 into the lower end of column 1 through openings 17. The introduction of air through openings 17 serves to not only promote complete combustion of the combustible mixture but also to effect intimate mixing of the products of combustion with the steam and acid and guide the flow vertically upwardly through the column 1. The method of the invention can be practiced in any desired equipment, and is not dependent upon the specific schematically illustrated apparatus shown in the drawing. Such apparatus is disclosed merely to provide the art with knowledge of one specific type of equipment which can be utilized.

A salient feature of the method of the invention resides in the fact that the solutions treated in accordance therewith are concentrated with respect to phosphate materials simultaneously with the elimination of fluorine therefrom.

The following examples are illustrative of the best mode presently known to the applicant for the practice of the method of the invention.

*Example I*

Wet process phosphoric acid prepared in conventional manner and containing about 27.81% by weight phosphorus pentoxide and having an elemental phosphorus to elemental fluorine weight ratio of about 6.0 is defluorinated in accordance with the method of the invention in an apparatus of the type schematically illustrated in the drawing.

To initiate the process, a combustible mixture of gaseous hydrocarbon fuel and air is introduced through the conduit 18 into the burner and mixer unit 10 where it is ignited by the igniter 19 to provide a flame within the tube 15 extending around the header 20 and upwardly into at least the lower reaches of the chamber 2. Wet process phosphoric acid, of the type described, is introduced through the conduit 22 into the header 20, valve 23 being adjusted to feed acid at the rate of about 0.84 gallon per minute. Concurrently with the flow of acid into the heater, steam is introduced thereinto through the conduit 24 at a temperature of about 312° F. and a pressure of about 65 pounds p.s.i. gauge, such that there is provided about three pounds of steam for each twenty pounds of phosphorus pentoxide in said phosphoric acid feed. The steam serves to atomize the acid introduced into the header 20 and propel such atomized acid upwardly through the mixing tube 21 into the flame provided by the burning fuel and air mixture. The atomized acid and steam are intimately mixed with the flame and entrained in the combustion gases thereby produced. The mixture of combustion gases, steam, and acid is propelled upwardly through the defluorination reaction chamber, and thence through the outlet duct 3 and into the entrainment separator 6. The period of residence of the acid, combustion gases, and steam in the chamber 2 is about two seconds. The temperature of the gases exiting through the stack 7 measured adjacent the separator 6 is about 270° F., hence such gases did not fall below that temperature in the chamber 2.

The liquid product collected from the product outlet line 7 is phosphoric acid containing about 59% by weight phosphorus pentoxide and having an elemental phosphorus to elemental fluorine weight ratio of about 37.4. It is apparent that the phosphoric acid employed is substantially defluorinated and concentrated by the method of the invention. The product acid can be recycled through the system to effect additional concentration and defluorination thereof.

The defluorinated product produced in the manner described in this example is particularly appropriate for subsequent and more complete calcium defluorination for the purpose of producing an extract from which feed grade dicalcium phosphate can be produced. Such a calcium defluorination is more fully described in copending Manning and LeBaron application Serial No. 511,624 entitled "Phosphatic Materials and Methods for the Production Thereof."

The fluorine compound containing gases and vapors discharged through the stack 8 are processed by treatment or scrubbing with caustic solution to recover fluorine in the form of sodium fluosilicates.

*Example II*

Example I is repeated with the exception that in this case there is employed as a feed, a solution of fluorine-containing phosphatic materials having a calcium oxide to phosphorus pentoxide mole ratio of about 0.18 and an elemental phosphorus to elemental fluorine weight ratio of about 7. The solution employed was prepared by acidulating phosphate rock with sulfuric acid in an amount equal to about 115% of that required to convert the phosphate values in the rock to monocalcium phosphate, thereafter, within a time period of not more than about an hour after acidulation, extracting the so acidulated rock with an aqueous medium, such as water, and removing the calcium sulfate and other insolubles from the extract. Reference is made to copending LeBaron application Serial No. 312,519 for a more detailed description of such a process.

The product so obtained is characterized by an elemental phosphorus to elemental fluorine weight ratio substantially higher than that of the feed solution and is substantially more concentrated with respect to monocalcium phosphate than the feed solution.

Such a product solution is particularly appropriate for calcium defluorination by the method of Manning and LeBaron application Serial No. 511,624 entitled "Phosphatic Materials and Methods for the Production Thereof."

*Example III*

Example I is repeated with the exception that the product obtained is repeatedly recycled under conditions to provide an average throughput of about 2.1 gallons per hour.

In this example, however, there is employed a wet process phosphoric acid containing about 28.29% by weight of phosphorus pentoxide and having an elemental phosphorus to elemental fluorine weight ratio of about 7.2.

The product from the entrainment separator, after several passes through the system, contains about 62.33% by weight of phosphorus pentoxide and is characterized by an elemental phosphorus to elemental fluorine weight ratio of 54.4.

The exit gases from the entrainment separator are processed to recover as sodium fluosilicate the fluorine values which are present therein.

In the operation of the apparatus as shown in the drawing, particularly under recycle conditions such as those illustrated by this example, foamy material may form in the system which should be recovered. The recovered foamy material can be utilized as a product or employed as a feed composition. It is contemplated in one method of the practice of the invention to preheat feed solution which is to be defluorinated to a temperature, for example, of at least about 220° F., preferably to a temperature of from about 240° F. to about 270° F. When such preheated feeds are employed, foaming of the type referred to with respect to the recycling operation may also occur. The art is well cognizant of adequate means for removing such foam from the system in those cases when it may be desired to do so.

The invention as described and illustrated is particularly appropriate for the production of solutions of phosphatic material of low fluorine content which can be employed, for example, by reaction with calcium bases, such as lime or limestone, to produce calcium phosphates, including particularly dicalcium phosphate, which are useful as animal feed supplements, as well as additional phosphatic compounds in which a low fluorine content is desired or essential.

I claim:

1. A process for eliminating fluorine from fluorine-containing phosphatic materials in aqueous solution which comprises concurrently introducing said solution and steam in an amount requisite to provide at least about three pounds of steam for each twenty pounds of phosphorus pentoxide present in said solution into a flame in a combustion zone under conditions to obtain a temperature of at least 300° F. in said combustion zone, intimately mixing and entraining said solution in subdivided condition in the combustion gases produced by said flame, removing said combustion gases, steam and entrained solution from said combustion zone, separating said solution from said combustion gases and recovering said separated solution as a product containing phosphatic materials of substantially reduced fluorine content.

2. The process of claim 1 wherein said solution is wet process phosphoric acid.

3. A process for eliminating fluorine from fluorine-containing phosphatic materials in aqueous solution which comprises concurrently introducing said solution in finely subdivided form and steam in an amount requisite to provide at least about three pounds of steam for each twenty pounds of phosphorus pentoxide present in said solution into a flame in a combustion zone under conditions to obtain a temperature of at least 300° F. in said combustion zone, intimately mixing and entraining said solution in subdivided condition in the combustion gases produced by said flame while maintaining the mixture at a temperature of at least 300° F., removing said combustion gases, steam and entrained solution from said combustion zone, separating said solution from said combustion gases, and recovering said separated solution as a product containing phosphatic materials of substantially reduced fluorine content.

4. The process of claim 3 wherein said solution comprises wet process phosphoric acid.

5. The process of claim 3 wherein said solution comprises a solution of monocalcium phosphate.

6. A process for eliminating fluorine from fluorine-containing phosphatic materials in aqueous solution which comprises concurrently introducing said solution in finely subdivided form and steam in an amount requisite to provide at least about three pounds of steam for each twenty pounds of phosphorus pentoxide present in said solution, into a flame under conditions whereby the resultant mixture of finely subdivided solution, steam and combustion gases is at a temperature within the range of from about 300° F. to about 900° F., intimately mixing said steam, finely subdivided solution and flame and entraining said finely subdivided solution in the combustion gases produced by said flame, thereafter separating said finely subdivided solution from said combustion gases and recovering said finely subdivided solution as a product solution containing phosphatic values of substantially reduced fluorine content.

7. A process for eliminating fluorine from fluorine-containing phosphatic materials in aqueous solution which comprises concurrently introducing said solution in finely subdivided form and steam in an amount requisite to provide at least about three pounds of steam for each twenty pounds of phosphorus pentoxide present in said solution into a flame under conditions whereby the resultant mixture of finely subdivided solution, steam and combustion gases is at a temperature within the range of from about 300° F. to about 900° F., intimately mixing said steam, finely subdivided solution and flame and entraining said finely subdivided solution in the combustion gases produced by said flame, maintaining said finely subdivided solution in intimate contact with said steam and combustion gases for at least two seconds while at a temperature of at least 300° F., thereafter separating said finely subdivided solution from said combustion gases and recovering said finely subdivided solution as a product solution containing phosphatic values of substantially reduced fluorine content.

8. The process of claim 7 wherein said solution comprises wet process phosphoric acid.

9. The process of claim 7 wherein said solution comprises a solution of monocalcium phosphate.

10. The process for eliminating fluorine from fluorine-containing phosphatic materials in aqueous solution which comprises atomizing said solution with steam in an amount requisite to provide at least about three pounds of steam for each twenty pounds of phosphorus pentoxide present in said solution directly into a flame in a combustion zone to intimately mix said atomized solution, flame and steam under conditions to obtain a temperature within the range of from about 500° F. to about 900° F. in said combustion zone, entraining said atomized solution and steam in combustion gases produced by said flame, passing said combustion gases, entrained steam and atomized solution through an elongated defluorination zone wherein said combustion gases and entrained steam and atomized solution are maintained at a temperature of at least about 300° F. for at least two seconds, thereafter separating said atomized solution from said combustion gases and steam and recovering said solution as a product containing phosphatic materials of substantially reduced fluorine content.

References Cited in the file of this patent

UNITED STATES PATENTS

| | | |
|---|---|---|
| 2,044,774 | Curtis | June 23, 1936 |
| 2,093,176 | Tromel | Sept. 14, 1937 |
| 2,143,865 | Copson | Jan. 17, 1939 |
| 2,155,119 | Ebner | Apr. 18, 1939 |
| 2,368,827 | Hanson et al. | Feb. 6, 1945 |
| 2,420,999 | Ayers | May 27, 1947 |
| 2,446,978 | Maust | Aug. 10, 1948 |
| 2,474,831 | Elmore | July 5, 1949 |
| 2,499,385 | Hubbuch et al. | Mar. 7, 1950 |
| 2,653,077 | Ogilvie | Sept. 22, 1953 |

FOREIGN PATENTS

| | | |
|---|---|---|
| 256,190 | Great Britain | Nov. 4, 1926 |